(12) United States Patent
Finzi et al.

(10) Patent No.: US 11,943,046 B2
(45) Date of Patent: Mar. 26, 2024

(54) METHOD TO CONFIGURE REAL-TIME COMMUNICATIONS IN A NETWORK WITH TIME-TRIGGERED AND RATE-CONSTRAINED TRAFFIC

(71) Applicant: TTTech Computertechnik Aktiengesellschaft, Vienna (AT)

(72) Inventors: Anaïs Finzi, Vienna (AT); Ramon Serna Oliver, Vienna (AT)

(73) Assignee: TTTech Computertechnik Aktiengesellschaft, Vienna (AT)

( * ) Notice: Subject to any disclaimer, the term of this patent is extended or adjusted under 35 U.S.C. 154(b) by 63 days.

(21) Appl. No.: 17/808,343

(22) Filed: Jun. 23, 2022

(65) Prior Publication Data
US 2023/0029812 A1    Feb. 2, 2023

(30) Foreign Application Priority Data
Jul. 29, 2021    (EP) ..................... 21188537

(51) Int. Cl.
*H04J 3/06* (2006.01)
*H04L 47/2416* (2022.01)
*H04L 47/28* (2022.01)
*H04L 47/76* (2022.01)

(52) U.S. Cl.
CPC ........ *H04J 3/0652* (2013.01); *H04L 47/2416* (2013.01); *H04L 47/28* (2013.01); *H04L 47/76* (2013.01)

(58) Field of Classification Search
None
See application file for complete search history.

(56) References Cited

U.S. PATENT DOCUMENTS

| | | | | |
|---|---|---|---|---|
| 11,526,787 | B1* | 12/2022 | Chen | G06N 3/0455 |
| 2016/0294721 | A1* | 10/2016 | Varadarajan | H04L 47/621 |
| 2017/0070439 | A1* | 3/2017 | Craciunas | H04L 12/413 |
| 2018/0302330 | A1* | 10/2018 | Bush | H04L 47/27 |
| 2019/0109728 | A1* | 4/2019 | Steiner | H04L 12/40 |
| 2020/0236038 | A1* | 7/2020 | Liu | H04L 47/76 |

(Continued)

OTHER PUBLICATIONS

European Search Report of European Patent Application No. 21188537.1 dated Jan. 28, 2022.

*Primary Examiner* — Mariela Vidal Carpio
(74) *Attorney, Agent, or Firm* — Eversheds Sutherland (US) LLP

(57) ABSTRACT

A network configuration for the transmission of communication flows in a real-time communication network, wherein the network comprises components, which are connected by links, wherein an arrangement of the components and links of the network is described by a network topology, wherein said components of the network communicate via a defined set of communication flows, wherein the method comprises a first, a second, and a third module, as well as a first and a second feedback loop, wherein in a first step the first module computes, based on said network topology and said set of communication constraints, one route for each communication flow of said set of communication flows, and wherein, in a second step, after the first step has finished, said second module, computes a time-triggered schedule for the communication of said TT flows, so that one or more of the constraints related to said TT flows are fulfilled.

18 Claims, 2 Drawing Sheets

(56) References Cited

U.S. PATENT DOCUMENTS

| | | |
|---|---|---|
| 2021/0073689 A1 | 3/2021 | Finzi et al. |
| 2022/0021625 A1* | 1/2022 | Tang .................... H04L 45/121 |
| 2022/0104062 A1* | 3/2022 | Aijaz ................ H04W 28/0268 |
| 2022/0141156 A1* | 5/2022 | Bush .................... H04L 49/254 |
| | | 370/401 |
| 2022/0278920 A1* | 9/2022 | Yang ...................... H04L 45/12 |
| 2022/0377144 A1* | 11/2022 | Mehmedagic .......... H04L 67/10 |
| 2023/0262760 A1* | 8/2023 | Wu .................. H04W 74/0808 |
| | | 370/338 |
| 2023/0328002 A1* | 10/2023 | Finn ................... H04L 49/9036 |
| | | 370/235 |

* cited by examiner

METHOD TO CONFIGURE REAL-TIME COMMUNICATIONS IN A NETWORK WITH TIME-TRIGGERED AND RATE-CONSTRAINED TRAFFIC

CROSS-REFERENCE TO RELATED APPLICATIONS

This applications claims priority to and the benefit of European Application No. EP 21188537.1, filed Jul. 29, 2021, which is hereby incorporated by reference herein in its entirety.

FIELD

The invention relates to systems and methods for computing a network configuration for the transmission of communication flows in a real-time communication network.

BACKGROUND

Real-time communication systems are generally present within computer systems involved in critical processes. For example, avionics and space, as well as automotive and industrial systems, are typical scenarios in which real-time systems are present.

It is common that said computer systems are distributed among multiple nodes working in coordination and exchanging data. Distributed computer systems may be organized as networks, comprising network components, like nodes performing specified tasks, and switches, bridges, or more generally starcouplers, interconnecting multiple nodes with each other. The exchange of data is thus performed via the transmission and forwarding of network packets across selected network components.

Some distributed real-time systems comprise deterministic time-aware networks, like TTEthernet (TTE) and Time Sensitive Networking (TSN). The communication of data in time-aware networks may be defined as communication flows, comprising the end nodes of the communication, the characteristics of the data being communicated (e.g. data size), as well as temporal requirements, or other constraints, like periodicity, end-to-end deadline, or maximum allowed jitter.

Communication within a time-aware network may be scheduled, wherein each communicated network packet of a scheduled communication flow, TT flow, is transmitted at a predefined point in time following a global communication schedule. However, not all communication flows in time-aware networks must be scheduled. For example, rate-constrained communication flows, RC flows, may be transmitted via rate-constrained mechanisms, like AVB or ARINC 664p7.

The computation of a communication schedule for time-aware networks can be performed offline. In doing so, communication flows are typically routed and scheduled offline, wherein temporal constraints, and optionally additional constraints, are considered during the computation of the schedule.

The fulfillment of constraints for RC communication flows can also be checked offline based on formal analysis methods, like Network Calculus or Compositional Performance Evaluation. In the case that RC and TT flows coexist within the same network, the formal analysis of RC flows can be adapted to account for the transmission points in time of network packets corresponding to scheduled TT flows. Therefore, the formal analysis may use the offline computed communication schedule to compute the temporal behavior RC flows, for example, determining their worst-case latency or worst-case jitter, as well as other metrics, like the peak memory required in network components to queue network packets in transit, or backlog.

The choices made during the computation of routes on a first step may cause the computation of a communication schedule on a second step to fail, and analogously, choices made during said first and second steps may cause the formal analysis performed on a third step to fail. Therefore, it is desirable to combine those steps in a form in which routing and scheduling choices, as well as formal analysis, are combined to fulfill the constraints of both types of communication flows. Moreover, optimization methods can be employed to not only fulfill said constraints but also improve the quality of the communication network according to some optimization criteria, for example, minimizing the worst-case end-to-end latency of communication flows, or minimizing the required memory in network components.

SUMMARY

This objective is achieved with a method described above, wherein said computation of the network configuration takes as input
   the network topology of said network,
   the communication flows which are to be communicated in said network, and as additional input a defined set of constraints, which constraints comprise one or more communication constraints, for example
   scheduling constraints, including
      a start or end time of transmission, relative to the period for one, more, or all, of said TT flows of the set of communication flows, and/or
      a start instant or an end instant of reception, relative to the period, for one, more, or all, of said TT flows in the set of communication flows, and/or
      a minimum or maximum gap between two or more of said TT flows in the set of communication flows, and/or
   real-time constraints, including
      the maximum or minimum allowed end-to-end communication latency for one, more, or all, of said set of communication flows, and/or
      the maximum allowed relative jitter in the reception of any of the periodic iterations for one, more, or all, of said set of communication flows, and/or routing constraints, including
      a set of preferred components to route one, more, or all, of said set of communication flows, for example to prefer faster components, and/or
   a set of forbidden components to route one, more, or all, of said set of communication flows, for example to avoid components without time-triggered communication capabilities for TT flows, and/or resource constraints,
      the maximum memory size available for network packet buffering for one, more, or all, of said network components,
      the maximum time span a network packet may be buffered before transmission in one, more, or all, of said network components, in particular switch or bridge components,
and wherein said network configuration comprises at least
   a set of routes, said set of routes comprising one route for each communication flow, each route comprising a network path in said communication topology from the sender node to the receiver(s) node(s), for example represented as a graph wherein the root vertex of said graph is the sender node and each of the receiver nodes is a leave vertex, and wherein each edge in the graph corresponds to a link in the communication network, and a time-triggered communication schedule for the transmission of the TT flows, comprising
   a transmission instant for each network packet of each TT flow, according to the route of said TT flow, and
   a set of optional RC shaping parameters, for example, AVB reserved bandwidth and/or a set of weights for the weighted round-robin, WRR, service, and wherein said set of routes and said set of schedules fulfill the constraints defined in said set of constraints, wherein the method comprises a first, a second, and a third module, as well as a first and a second feedback loop, wherein said first module, the so-called "routing" module, is configured to compute routes for communication flows in the communication network, said second module, the "scheduling" module, is configured to compute time-triggered schedules for TT flows, and said third module, the "analysis" module, is configured to provide a formal timing analysis verifying the fulfillment of constraints, wherein in a first step the first module computes, based on said network topology and said set of communication constraints, one route for each communication flow of said set of communication flows, whereby one or more, preferably all, routing constraints of said related set of constraints of said flows are fulfilled, and wherein, in a second step, after the first step has finished, said second module, based on
   all TT flows of said set of communication flows,
   all constraints related to said TT flows, and
   said routes for each said TT flows computed by the first module, computes a time-triggered schedule for the communication of said TT flows, so that one or more, preferably all, of the constraints related to said TT flows are fulfilled, and wherein in a third step, after the second step has finished, the third module performs a formal timing analysis, according to which the third module analyzes if at least the real-time constraints and resource constraints, and optionally other constraints, from said set of constraints are fulfilled, based on the network routes provided by said first module and the time-triggered schedule provided by said second module, and wherein, said first feedback loop is provided, according to which in the case that the second module cannot compute a time-triggered schedule or if the computed time-triggered schedule is not able to fulfill all of said scheduling constraints, said first feedback loop provides information to the first module, wherein said information provided by the first feedback loop relates to one or multiple TT flows from said set of communication flows, which are selected to be rerouted by said first module, whereby the criteria to select said candidate TT flow(s) is, preferably based on one or more of the following criteria, the largest or shortest period(s), and/or maximum or minimum size(s) of the communication data of said TT flow(s), and/or the largest number of scheduling constraints related to said TT flow(s), and/or an estimation of the complexity of scheduling said TT flow(s) within the network components of the current route(s) of said TT flow(s), and/or a defined order, for example based on the unique identifier of said TT flows, and/or a random selection of one or multiple TT flow(s) from the set of communication flows, and wherein the first module according to said information from the first feedback loop re-computes a route for said one or multiple TT flow(s), whereby said recomputed route for each TT flow is a different route than the previous route for said TT flow, and provides the re-computed route(s) to the second module for executing the second step again, and wherein, said second feedback loop is provided, according to which in the case that the formal analysis of the third module shows that not all constraints are fulfilled, provides information to the second module, wherein said information provided by the second feedback loop relates to one or multiple TT flows from said set of communication flows, which are selected to be rescheduled by said second module, whereby the criteria to select said so-called "candidate" TT flow(s) is, preferably based on one or more of the following criteria, the bandwidth utilization and/or density of scheduled transmissions on the links comprised in the route of said TT flow(s), and/or the largest or shortest period(s), and/or maximum or minimum size(s) of the communication data of said TT flow(s), and/or the largest number of scheduling constraints related to said TT flow(s), and/or a defined order, for example based on the unique identifier of said TT flows, and/or a random selection of one or multiple TT flow(s) from the set of communication flows, and wherein, the second module according to said information from the second feedback loop re-computes the schedule for said one or multiple TT flow(s), whereby said recomputed schedule for said TT flow(s) is a different schedule than the previous schedule, and provides the re-computed schedule to the third module for executing the third step again.

Furthermore the invention relates to a real-time communication network, which comprises
   components, like nodes or starcouplers,
      which components are connected by links, and wherein an arrangement of the components and links of the network is described by a network topology, and wherein
   said components of the network communicate via a defined set of communication flows, wherein
   each of said communication flows comprises an iterative communication of data, each iteration comprising one or multiple network packets, and wherein
   said communication flows comprise time-triggered flows, "TT flows", and rate-constrained flows, "RC flows", and wherein
   each of said communication flows comprises
      one sender node, source of the communicated data, and one or multiple destination nodes, receiver(s) of the communicated data, and a unique identifier, for example a unique name or a unique number, and, the maximum size of the communicated data in one iteration, and the period of the communication iterations, being the exact communication period for TT flows, and the minimum communication period for RC flows, wherein said minimum communication period defines the minimum time distance between any two successive communication iterations, wherein the communication flows of the network are communicated according to a network configuration, and wherein said real-time network is configured to compute said network configuration for the transmission of the communication flows with a method according to the invention.

Finally, the invention relates to a computer system, for example a cloud-based computer system, for executing a method according to the invention.

Said computer system may be part of or may be connected to a real-time communication network as described before, or wherein for example said computer system comprises a real-time communication network as described before.

It may be provided that each of the modules, in particular the routing module, scheduling module, and analysis modules, and/or said first, second, and optionally third, feedback loops, are implemented in the computer system as software components, which are independent from each other, or are combined in one or more software components, which software component or software components are running on said computer system, or are implemented in one or more software libraries.

Advantageous embodiments of the method, the real-time network and the computer system according to the invention described above are detailed hereinafter, wherein said embodiments may be realized alone or in any arbitrary combination:

It may be provided that a third feedback loop is provided, according to which in the case that the formal analysis shows that not all constraints are fulfilled, or the second module cannot compute a new route for the selected communication flow(s), provides information to the first module, wherein said information provided by the third feedback loop relates to one or multiple flows from said set of communication flows, which are selected to be rerouted by said first module, whereby the criteria to select said candidate flow(s) is, preferably based on one or more of the following criteria, the largest or shortest period, and/or maximum or minimum size of the communication data of said flow, and/or an estimation of the effect on the fulfillment of constraints determined by the formal analysis upon rerouting said flow(s), and/or the largest number of constraints related to said flow(s), and/or a defined order, for example based on the unique identifier of said flows, and/or a random selection of one or multiple flow(s) from the set of communication flows, and wherein the first module according to said information from the third feedback loop re-computes a route for said one or multiple TT flow(s), whereby said recomputed route for said TT flow(s) is a different route than the previous route(s), and provides the re-computed route(s) to the second module for executing the second step again, wherein the execution of said third feedback loop or said second feedback loop are exclusive to each other and the decision which of said two loops will be executed is based on defined criteria, which defined criteria comprise a defined maximum number of consecutive occurrences of either of the second or third feedback loops, and/or a defined function choosing each time one of said second or said third feedback loops with a rate proportional to a defined factor of the runtimes of said second and third feedback loops, and/or a defined function selecting said second or third feedback loop based on an estimation if the effect of rescheduling or rerouting a selected TT flow on the formal analysis, for example estimating the available time in the schedule of the network component(s) in which the formal analysis failed, and/or a random choice.

It may be provided that the first, second and third step and the first, second and optionally third feedback loops are executed iteratively until a configuration fulfilling all constraints is found, or a defined time interval elapses, whereby either of said conditions terminates the method.

It may be provided that the set of constraints additionally comprises optimization constraints, including minimize the end-to-end communication latency of one, more, or all, of said set of flows, and/or minimize the maximum reception/transmission jitter of one, more, or all, of said set of communication flows, and/or minimize the maximum memory required to temporary store network packets in transit of one, more, or all, of said network components, and/or minimize the worst-case end-to-end communication latency for one, more, or all, of said set of communication flows, and/or maximize/minimize the length of intervals in which no TT flows are scheduled for one, more, or all, of said network components, and/or minimize/maximize the intervals in which continuous TT flows are scheduled for one, more, or all, of said network components.

and wherein, said optimization constraints are considered by the first, second, and third module as well as the first, second, and optionally third feedback loop during their execution, and wherein preferably the method stops, when the computed network configuration cannot be further optimized according to said optimization constraints and all other constraints are fulfilled, or if a pre-defined time limit is reached.

It may be provided that the first module limits the number of different routes computed for a flow to a predefined maximum number of routing iterations per flow, wherein preferably the first feedback loop and optionally the third feedback loop use said maximum number as a criterion to select the flow(s) to be rerouted.

It may be provided that the second module limits the computation of a different schedule for a set of TT flows with the same routes to a predefined maximum number of scheduling iterations, wherein preferably the second module will not compute new schedules for a set of TT flows after said predefined number of continuous iterations are reached without having had any of said TT flows rerouted by the first module.

It may be provided that a long-term memory is provided, which is shared and updated by the first, second, and third modules as well as the first, second, and optionally third feedback loop, wherein
said long-term memory keeps track of
  a complete set, s1, of explored routes for the set of communication flows, wherein
    each element, s2, in said is a set in itself, whereby for each flow in the set, s1, of communication flows, there is a tuple in said set s2 comprising said flow and the route of said flow, wherein
    each element in s1 represents a mapping of each of the communication flows in the set of communication flows to its route after each iteration of module 1,
and/or
  the set of initial routes for each flow, as computed in the first iteration of the first module, and/or
  the best configuration found so far, comprising the set of routes and schedules computed by the first and second modules, whereby the largest number of constraints in the set of constraints are fulfilled,
and wherein, preferably
the first, second, and third module as well as the first, second, and optionally third feedback loop, base their execution on the content of said long-term memory.

It may be provided that a medium-term memory is provided, which is shared and updated by the first, second, and/or third modules as well as the first, second, and/or optionally third feedback loop, wherein
said medium-term memory keeps track of
  a set of explored routes within consecutive iterations of the first feedback loop, and/or
  a set of computed routes within consecutive iterations of the third feedback loop, and/or
  a set of computed schedules for consecutive executions of the second module with the same set of routes for the TT flow, and/or
  the last successful schedule, if any, for the TT flows while the routes TT flows are not changed, for example, when the rerouting of an RC flow occurs,
and wherein, preferably
the first, second, and third module as well as the first, second, and optionally third feedback loop, base their execution on the content of said medium-term memory.

It may be provided that
  in the case that the formal analysis of the third module shows that not all constraints are fulfilled and a predefined time limit is reached, a partial network configuration is provided, wherein said partial network configuration relates to a subset of flows of the set of flows fulfilling a subset of the related constraints in the set of constraints, or
  in the case that the formal analysis of the third module shows that not all constraints are fulfilled and a predefined number of iterations, of either first, second, or optionally third feedback loops, is reached, a partial network configuration is provided, wherein said partial network configuration relates to a subset of flows of the set of flows fulfilling a subset of the related constraints in the set of constraints, or
  in the case that the formal analysis of the third module shows that all of the communication constraints are fulfilled and at least one, preferably all, of the optional optimization constraints are optimized to a defined threshold with respect to the optimal value, a partial network configuration is provided, wherein said partial network configuration relates to a subset of flows of the set of flows fulfilling a subset of the related constraints in the set of constraints.

It may be provided that said partial network configuration is selected among all previous configurations computed in preceding iterations, and wherein said selection is based on defined criteria, including
  the single one, or any one if multiple exist, of the configuration(s) fulfilling (a) the larger number of communication constraints of the set of constraints, or
  the single one, or any one if multiple exist, of the configuration(s) fulfilling (b) all related communication constraints of the set of constraints for the largest subset of communication flows of the set of communication flows,
wherein optionally, among all existing configurations fulfilling (a) or (b), the configuration additionally fulfilling the larger number of optimization constraints from the set of constraints is selected.

It may be provided that the network is a time-triggered, TT, network or a time-sensitive, TSN network, and wherein components of said time-triggered network communicate TT flows according to a schedule based on a global, network-wide time.

It may be provided that TT flows are transmitted according to TTEthernet or TSN/802.1Qbv.

It may be provided that RC flows are transmitted according to ARINC 664p7 or AVB/TSN.

It may be provided that any one of the modules, preferably the first module and/or the second module, is/are based on exact methods, such as SMT or ILP or MIP solvers.

It may be provided that any one of the modules, preferably the first module and/or the second module, is/are based on heuristic methods, such as Tabu search or Simulated Annealing.

It may be provided that the formal analysis in the third module is based on Network Calculus.

It may be provided that the first, second, and third module as well as the first, second, and optionally third feedback loop are executed in a computer system.

It may be provided that the first, second, and third module as well as the first, second, and optionally third feedback loop are executed in a distributed computer system, for example, a cloud-based computer system.

An advantage of the invention with respect to prior art lies in the combination of routing, scheduling, and formal analysis in one single method to compute a network configuration.

Another advantage of the invention with respect to prior art lies in the definition of an iterative workflow including feedback loops between said routing, scheduling, and formal analysis, allowing the computation of a network configuration in successive iterative steps.

Another advantage of the invention with respect to prior art lies in the possibility to define optimization constraints, allowing the method to perform optimization improvements on each successive steps, until either a fully optimized network configuration, or a network configuration optimized to a defined threshold, is computed.

Another advantage of the invention with respect to prior art is the possibility to constrain its duration, for example by defining a time limit or a maximum number of iterations, whereby the method provides either a final network configuration, or the best partial configuration, computed within said constrained duration.

Another advantage of the invention with respect to prior art is its modularity, allowing multiple implementations of said routing, scheduling, and formal analysis, based on optimal or heuristic methods, whereby the invention can be used as a general framework to compute configurations for different network characterizations, and fulfilling the constraints of different transmission protocols, like TSN, TTEthernet, AVB, or AFDX.

Another advantage of the invention with respect to prior art lies in its optional parametrization, wherein defined parameters can guide the workflow of the method to iterate, via said feedback loops, preferably over the routing module, or over the scheduling module, allowing to guide the computation based on criteria, like for example, the execution time, or the computation complexity, of each module.

BRIEF DESCRIPTION OF FIGURES

In the following, in order to further demonstrate the present invention, illustrative and non-restrictive embodiments are discussed, as shown in the drawings. In the drawings

DETAILED DESCRIPTION

Exemplary Embodiments

In the following a method to configure real-time communications in a real-time distributed system using scheduled and rate-constrained communication flows according to the invention is described based on an example which is not limiting the scope of protection of the invention. The method comprises the computation of a final network configuration, including routing and scheduling configurations, whereby the computed network configuration is subject to a formal analysis and fulfills, fully or partially, a defined set of constraints.

Figure 1:
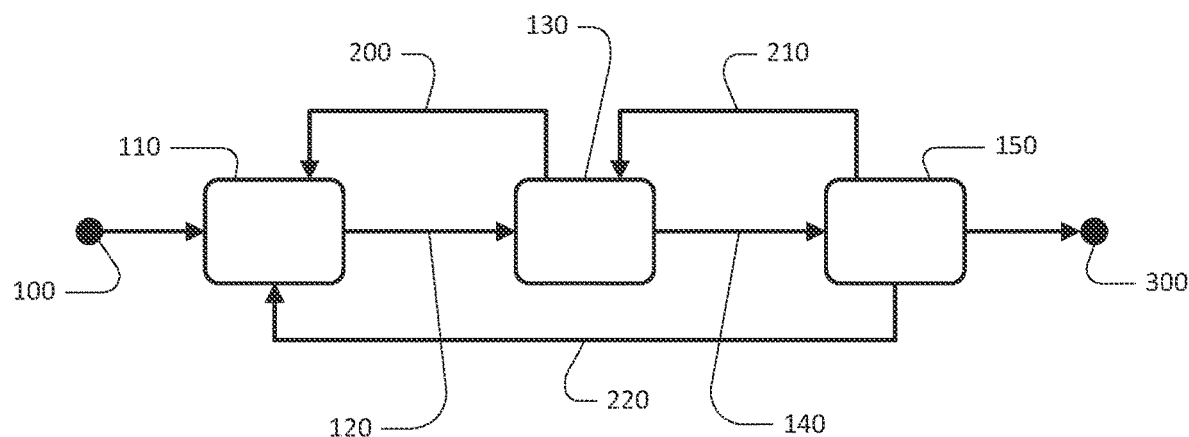
FIG. 1 depicts an overview of the workflow of the method according to the invention.

An overview of the workflow of the method is depicted in FIG. 1.

The inputs 100 of the method comprise a description of the network, including
  a network topology, comprising network components like nodes and starcouplers, for example bridges or switches, and 1a set of communication flows, comprising scheduled time-triggered flows, TT flows, and rate constraint flows, RC flows, and
  a set of constraints, comprising
    communication constraints like scheduling, real-time, routing, resource constraints, and
    optionally optimization constraints.

The method computes a final configuration 300, the output of the method, based on said inputs, wherein the computation of said final configuration is based on three modules, namely, routing 110, scheduling 130, and formal analysis 150 modules.

The routing module 110 computes routes based on the network topology subject to constraints, particularly, the routing constraints. The output 120 of the routing module 130 is provided as input to the scheduling module.

The scheduling module 130 schedules the TT flows based on the network topology and the routes of said TT flows, as computed by the routing module, subject to constraints, in particular the scheduling constraints. The output 140 of the scheduling module 120 is provided as input to the analysis module 150.

The formal analysis module 150 checks whether the computed configuration, comprising the routing of TT and RC flows and the TT schedule, fulfills constraints, in particular the real-time and resource constraints, and optionally optimization constraints, and outputs the final configuration 300.

In an ideal scenario, in a first step, the routing module 110 computes routes for the set of flows, including TT and RC flows, considering a subset of the constraints related to the routes, and outputs results 120 to the scheduling module. Following, the scheduling module 130 schedules the subset of TT flows, based on the computed routes, considering a subset of the constraints affecting scheduling, and output results 140 to the formal analysis module 150. Lastly, the formal analysis module 150 checks the fulfillment of the set of constraints and outputs a final configuration 300.

In a realistic scenario it is unlikely to satisfy all constraints on the first execution of each module. In particular due to the sequential approach of the method according to the invention, wherein in a first step routes are computed, and, in a second step, a schedule is computed based on the computed routes, the solution space when performing the second step is subject to the results determined by a first step, so that a different result provided in the first step may conduct to a different, potentially larger, overall solution space.

Therefore, the method comprises two, optionally three, feedback loops driving the iterative execution of the method, in order to refine the configuration until all constraints are fulfilled, or a defined termination condition is met.

In case that the scheduling module cannot find a schedule for the subset of TT flows, a first feedback loop 200 provides information to the routing module to find an alternative route for one, or more, of the TT flow(s). Said information comprises the one, or more, TT flow(s) identified as having the highest impact on the schedulability of the set of TT flows.

In case that the formal analysis determines that not all constraints are fulfilled, a second feedback loop 210 provides information to the scheduling module to find an alternative schedule for one, or more, of the TT flow(s). Said information comprises the one, or more, TT flow(s) identified as having the highest impact on the constraints, in particular, on the constraints affecting RC flows.

As an alternative to the second feedback loop, in case that the formal analysis determines that not all constraints are fulfilled, or, in the case that finding a new schedule is not possible with the current routes of the set of communication flows, an optional third feedback loop 230 provides information to the routing module to find an alternative route for one, or more, of the communication flow(s).

The iterative execution of the three modules produces multiple configurations, namely, one configuration for every execution of the analysis module. A configuration is considered a final configuration when all constraints are fulfilled, including all optimization constraints being maximally optimized. Among all other configurations different than the final configuration, referred to as partial configurations, a best partial configuration is selected on each iteration, wherein said best partial configuration is the partial configuration maximizing defined criteria.

In the case that a final configuration is not found before the defined time limit is reached, or a maximum defined number of iterations of any one, or the sum of, the modules and/or feedback loops, the method outputs the best partial configuration instead.

Alternatively, the method may also terminate, providing the best partial configuration as output, if optimization constraints are provided and these have been optimized to a defined threshold with respect to the optimal value. For example, if the defined optimization threshold is 10, the method will terminate once the set of values for the provided optimization constrains are within a 10of the optimal value.

As mentioned, the method according to the invention comprises said routing, scheduling, and analysis modules, and said first, second, and optionally third, feedback loops, which may be implemented in a computer system, each as an independent software component, or combined in one, or multiple, software components, or be part of one, or multiple, software libraries.

The execution flow of the method, detailed in FIG. 1, may be implemented as an algorithm, preferably a software algorithm, executing each said module and feedback loops, according to the depicted workflow, whereby said execution of said modules and said feedback loops by said algorithm may be performed via the execution of one, or multiple, software components, or via the execution of software calls to said one or multiple software libraries, implementing said modules and said feedback loops.

Predefined Parameters

The computation of said network configuration comprises the search of a valid solution within a solution space of possible solutions, wherein said solution space can be very extensive in networks comprising large topologies and/or large number of communication flows. Said search of a valid solution is driven iteratively by the computation of different routes and/or different schedules, performed by said routing and scheduling modules, and respectively said first, second, and optionally third feedback loops. It is possible that the search falls in areas of the solution space representing "local optima", wherein the method may perform successive improvements of the solution by performing small adjustments in either routes or schedules of one, or a set, of selected flow(s), despite rerouting, or rescheduling, a different flow, or set of flows, could lead to an existing better solution in the search space. However, the method may exhaust the defined available time doing rerouting, or rescheduling, iterations over the same selection of flow(s), hence resulting in a termination before exploring the remaining solution space or causing a much larger runtime to reach certain areas of the solution space.

To avoid falling in local optima, and spreading the search within the solution space, the method may limit the workflow by the definition of optional parameters, namely by:

a predefined maximum number of schedules per route of TT flows, whereby the scheduling module will limit the computation of new, different, schedules for a TT flow with one computed route to said maximum number, and/or by a predefined maximum number of routes per flow, whereby the routing module will limit the number of new, different, routes for each communication flow to said maximum number.

An implementation of the method may use said predefined maximum number of schedules to determine that a new schedule for the set of TT flows cannot be computed after said predefined maximum number of schedules is reached without successfully finding a final configuration. The practical effects of said limit is to reduce the runtime of the computation, by forcing the method to reroute after so many rescheduling steps are tried, hence avoiding spending time on variations the schedule based on the same routes instead of trying to reroute, potentially causing a larger impact on the configuration, and consequently exploring a different area of the solution space.

In addition or alternatively the method may use said predefined maximum number of routes per flow to determine that a new route for a flow cannot be computed after said predefined maximum number of routes is reached without successfully finding a final configuration. The practical effects of said limit is to reduce the runtime of the computation, by avoiding an exhaustive exploration of all possible route combinations of one flow before selecting a different one, potentially causing a larger impact on the configuration, and consequently exploring a different area of the solution space.

Constraints

The method computes a final configuration subject to a set of constraints, wherein said set of constraints comprises one or more communication constraints, preferably scheduling constraints, including a start or end time of transmission, relative to the period for one, more, or all, of said TT flows of the set of communication flows, and/or a start instant or an end instant of reception, relative to the period, for one, more, or all, of said TT flows in the set of communication flows, and/or a minimum or maximum gap between two or more of said TT flows in the set of communication flows, and/or real-time constraints, including the maximum or minimum allowed end-to-end communication latency for one, more, or all, of said set of communication flows, and/or the maximum allowed relative jitter in the reception of any of the periodic iterations for one, more, or all, of said set of communication flows, and/or routing constraints, including a set of preferred components to route one, more, or all, of said set of communication flows, for example to prefer faster components, and/or a set of forbidden components to route one, more, or all, of said set of communication flows, for example to avoid components without time-triggered communication capabilities for TT flows, and/or resource constraints, the maximum memory size available for network packet buffering for one, more, or all, of said network components, the maximum time span a network packet may be buffered before transmission in one, more, or all, of said network components, in particular switch or bridge components, and, said set of constraints may include one or more optional optimization constraints, preferably minimize the end-to-end communication latency of one, more, or all, of said set of flows, and/or minimize the maximum reception/transmission jitter of one, more, or all, of said set of communication flows, and/or minimize the maximum memory required to temporary store network packets in transit of one, more, or all, of said network components, and/or minimize the worst-case end-to-end communication latency for one, more, or all, of said set of communication flows, and/or maximize/minimize the length of intervals in which no TT flows are scheduled for one, more, or all, of said network components, and/or minimize/maximize the intervals in which continuous TT flows are scheduled for one, more, or all, of said network components.

Modules

The routing module comprises a routing algorithm, preferably implemented in a computer system, wherein said algorithm computes network routes for a defined set of communication flows. The algorithm takes as inputs the network topology, comprising network components, like endpoints, or nodes, and starcouplers, like bridges or switches, and a set of links between said components, and the set of communication flows, each defining a source node and one or more destination nodes from said topology, and optionally the set of routing constraints.

An implementation of a routing algorithm can be based on graph theory, for example by determining the shortest path, for example implementing the Dijkstra shortest path algorithm, between pairs of vertexes, representing nodes, connected in the graph by directional edges, representing links. If a set of optional routing constraints is provided, the routing algorithm shall be tailored to satisfy those constraints, for example, removing vertexes from the graph if a routing constraint requires the respective component to be avoided.

A particularity of the routing algorithm is the capability to reroute communication flows on request via an alternative, different, route than any of the previous computed routes for said flow. For example, by computing on a first step all possible routes for a communication flow on a list of routes and delivering the next one on the list upon each successive request.

The scheduling module comprises a scheduling algorithm, preferably implemented in a computer system, wherein said algorithm computes time-triggered schedules for a defined set of communication flows. The algorithm takes as inputs the network topology, comprising network components, like endpoints, or nodes, and starcouplers, like bridges or switches, and a set of links between said components, and the set of TT flows, and the set of routes, one for each of the TT flows, comprising a succession of network components and links, and optionally the set of scheduling constraints.

An implementation of a scheduling algorithm can be based on optimal methods, like SMT or MIP solvers, whereby the term optimal method means that if there is a solution it will be found, even though it may take a very long time, due to the exhaustive search of the entire solution space, which grows exponentially with respect to the size of the inputs. In an implementation using said optimal methods a set of time-triggered constraints may be formulated as mathematical equations determining the time of transmission of each network packet of a TT flow transmitted along the computed route, said constraints comprising the sequential timeliness of communication, beginning at the source node and following along the links in the route to the receiver node(s), and the contention-free configuration of transmissions, whereby no two scheduled frames shall be scheduled at time instants creating contention, or collisions, on egress, and the cyclic nature of communication, resulting from combining the periods of all TT flows in a hyper-period, or hypercycle, typically computes as the least common multiple of all said periods, and defined latencies of communication operations, like hardware delays and packet processing latency, as well as defined link propagation latencies, and defined bounds for the time synchronization of network components, typically as a result of a time-synchronization protocol, like IEEE 802.1AS or SAE AS6802.

If a set of optional scheduling constraints is provided, the scheduling algorithm shall be tailored to satisfy those constraints, for example, adding explicit mathematical equations representing the maximum time distance between transmission of the first network packet and the reception of the last network packet of a scheduled flow if a scheduling constraint requires a maximum end-to-end latency to be fulfilled.

A different implementation of a scheduling algorithm can be based on suboptimal methods, like heuristic methods, for example Tabu search or Simulated Annealing, whereby the term suboptimal method means that the algorithm will not search the complete solution space, and therefore it may miss a solution fulfilling all constraints. However, suboptimal methods, like those based on heuristics, are typically tailored to perform near-to-optimal solutions with a much lower average runtime than that of optimal methods.

A particularity of the scheduling algorithm is the capability to reschedule TT flow(s) on request, to an alternative, different, time-triggered schedule. For example, by adding explicit constraints to forbid the values in a computed schedule, comprising the transmission time instants of network packets comprised by said TT flow, upon each successive request, hence forcing the computation of a new schedule to differ from any previous computed schedule for said TT flow(s).

The analysis module comprises a formal analysis algorithm, preferably implemented in a computer system, wherein said algorithm analyzes a configuration and determines whether a defined set of constraints are fulfilled. The algorithm takes as inputs the network topology, comprising network components, like endpoints, or nodes, and starcouplers, like bridges or switches, and a set of links between said components, and the set of communication flows, comprising TT and RC flows, and the set of routes, one for each of the communication flows, and the set of schedules, one for each of the TT flows in the set of communication flows, and the set of real-time constraints and/or resource constraints, and optionally, additional constraints.

An implementation of a formal analysis algorithm can be based on network analysis methods, like Network Calculus, whereby the service curves at each network component, in particular, at each link of each network component, is computed, by means of (min,+) Algebra, to determine the worst-case queuing of network packets conforming said communication flows, and thereby obtaining upper bounds for real-time and resource constrained metrics, like the end-to-end latency and/or maximum jitter of RC flows, as well as the peak queue size required by network components.

A particularity of the formal analysis algorithm is the capability to account for scheduled flows, wherein the computation of service and demand curves incorporates the transmission of TT flows. A simple approach may disregard the fact that TT flows are scheduled and consider TT flows as if they were RC flows, hence obtaining a pessimistic upper bound based on an arbitrary service time for TT flows. A more precise approach may take into consideration the exact transmission time of network packets comprised in scheduled TT flows and compute a curve in which TT traffic is serviced according to said schedule.

Long-Term Memory

An implementation of the three modules may use historic information, preferably in the form of data stored in a computer system, to perform their computations. In particular, the iterative execution of modules 110, 130, 150 and feedback loops 200, 210, 220 may be based on long-term memory, persistent during the complete execution of the method, storing a set of explored network routes, wherein each network route comprises one route for each of the communication flows—said set of explored network routes is updated after a new route is computed by the routing module, hence resulting in a different combination of routes. An implementation of the method may use the set of explored network routes to
        avoid repeating combinations of routes which have been already computed, and/or
        determine whether new, different, routes than those already computed, exist;

and/or storing the set of initial routes for each flow, as computed in the first iteration of the first module—said set of initial routes is updated upon the first execution of the routing module. An implementation of the method may use the set of explored network routes to
        revert the route of a flow to its default, initial route, when no more routes for said flow can be computed and no schedule for said flow could be computed with any of the computed routes, and therefore, a new, different, flow is selected for rerouting, and/or storing:

the best partial configuration found so far, comprising the set of routes and schedules computed by the first and second modules, whereby the largest number of constraints in the set of constraints are fulfilled, preferably being
        the first partial configuration if no other partial configuration has been computed, or
        the partial configuration fulfilling the communication constraints for the largest subset of communication flows, among all other partial configurations, or
        if all constraints are fulfilled by the new and the previous configurations and optional optimization constraints are provided, the new configuration optimizes, fully, or partially, said optimization constraints to a larger degree, for example
            evaluating the values of said new configuration against a set of pareto fronts, or
            if the values of said new configuration are closer to the optimal value than the values of the previous configuration for a larger subset of constraints, or
            evaluating the values of said new configuration against a set of weighted optimal values for each optimization constraints.

Said best partial configuration may be updated upon each execution of the analysis module, if the analysis performed by said analysis module shows that the current configuration is better than any previous configuration. An implementation of the method may use said best partial configuration to output a final, or partial, configuration when the conditions to terminate are met.

Medium-Term Memory

The iterative execution of modules 110, 130, 150 and feedback loops 200, 210, 220 may be based on medium-term memory, persistent during successive executions of a module, storing the set of computed routes in consecutive executions of the first feedback loop:
    Said set of computed routes in consecutive executions of the first feedback loop is updated after each successive iteration of the first feedback loop and cleared upon the execution of either the second or third feedback loops. An implementation of the method may use said set of computed routes in the first feedback loop to determine whether a defined maximum number of routes have been explored via the first feedback loop.

and/or storing the set of computed routes in consecutive executions of the third feedback loop:
    Said set of computed routes in consecutive executions of the third feedback loop is updated after each successive iteration of the third feedback loop and cleared upon the execution of either the first or second feedback loops. An implementation of the method may use said set of computed routes in the third feedback loop to determine whether a defined maximum number of routes have been explored via the third feedback loop.

and/or storing a set of computed schedules in consecutive executions of the second feedback loop:
    Said set of computed schedules in consecutive executions of the second feedback loop is updated after each successive iteration of the third feedback loop and cleared upon the execution of either the first or second feedback loops. An implementation of the method may use said set of computed schedules in the third feedback loop to determine whether a defined maximum number of schedules have been explored via the third feedback loop.

and/or storing the last successful schedule, including the set routes for the set of scheduled TT flows, if any:
    Said last successful schedule is updated after each successive execution of the scheduling module. An implementation of the method may use said last successful schedule to revert to the last successful schedule and routes for the set of TT flows before performing the rescheduling of a selection of one, or multiple, TT flows, thereby increasing the chances of successfully scheduling the selection of TT flow(s) and reducing the required computation runtime.

Method Workflow

In an implementation of the method including the optional third feedback loop, if the analysis module determines that not all constraints are fulfilled, the method may iterate either over the first feedback loop, or the third feedback loop, wherein the decision for one or the other directs the search of a solution towards different regions of the solution space. Different choices are possible, namely An implementation may base the decision on a pure random choice.
    A different implementation may base the decision on a defined maximum number of iterations of the same feedback loop. For example, said implementation may choose on a first iteration the second feedback loop, hence forcing the rescheduling of a selected flow, and, in subsequent iterations, repeat the choice of the second feedback loop, as long as the second module is able to compute a new, different, schedule, up to a maximum defined number of iterations, whereby after said maximum defined number of iterations the third feedback loop is chosen.

A different implementation may base the decision on the average computation time, measured during execution, or estimated at design time, of the respective routing and scheduling modules. For example, said implementation may estimate that the routing module takes on average a portion of the computation time of the scheduling module, and therefore choose the second, or third, feedback loops in a proportional manner, to balance the accrued computation time spent on either first and second modules.

A different implementation may base the decision on an estimated effect of either rescheduling or rerouting a selected flow, wherein said estimation may simulate rescheduling and/or rerouting said selected flow, without performing the computation of new routes and/or new schedules, and determine which of the two modules would have a larger impact on a subsequent analysis performed by the analysis module.

Flow Selection in the First Feedback Loop

In the case that the scheduling module cannot compute a time-triggered schedule or if the computed time-triggered schedule is not able to fulfill all of the scheduling constraints, the first feedback loop may select one, or multiple, of the TT flows in the set of communication flows to be rerouted by the routing module.

An implementation of the first feedback loop may choose said TT flow(s) to be rerouted based on a sorted list of all TT flows, wherein the order in the list is determined by the length of the period, and/or the data size of said TT flows, for example, by selecting the first TT flow(s) in said sorted list of all TT flows.

A different implementation of the first feedback loop may choose said TT flow(s) to be rerouted based on a different sorted list of all TT flows, wherein the order in said list is determined by the number of scheduling constraints affecting said TT flows, for example, by selecting the first TT flow(s) in said sorted list of all TT flows.

Yet a different implementation of the first feedback loop may choose said TT flow(s) to be rerouted based on a different sorted list of all TT flows, wherein the order in said list is determined by an estimation of the complexity of scheduling said TT flow(s), wherein said complexity of scheduling may be, for example, determined by the amount of network packets comprising said TT flows and the availability of unscheduled time intervals on the links comprised in the routes of said TT flow(s).

Another implementation of the first feedback loop may choose said TT flow(s) based on a predefined order among all TT flows, or based on a random selection.

Flow Selection in the Second Feedback Loop

In the case that the analysis module determines that not all constraints are fulfilled, the second feedback loop may select one, or multiple, of the TT flows in the set of communication flows to be rescheduled by the scheduling module.

An implementation of the second feedback loop may choose said TT flow(s) to be rescheduled based on a sorted list of all TT flows, wherein the order in the list is determined by the length of the period, and/or the data size of said TT flows, for example, by selecting the first TT flow(s) in said sorted list of all TT flows.

A different implementation of the first feedback loop may choose said TT flow(s) to be rerouted based on a different sorted list of all TT flows, wherein the order in said list is determined by the required bandwidth utilization to transmit said TT flow(s), or the density of the already scheduled transmissions, for example measured as the number of scheduled flows per time unit or measured as the portion of time occupied by the transmission of scheduled flows per defined time unit, on the links comprised in the routes of said TT flow(s), wherein a high bandwidth utilization or high density of scheduled transmissions restrict the transmission opportunities for RC flows, and therefore affect the fulfillment of constraints.

Another implementation of the second feedback loop may choose said TT flow(s) based on a predefined order among all TT flows, or based on a random selection.

Flow Selection in the Third Feedback Loop

In the case that the analysis module determines that not all constraints are fulfilled, or the routing module cannot compute a new route for one or multiple selected flow(s), the second feedback loop may select one, or multiple, of the communication flows in the set of communication flows to be rerouted by the routing module.

An implementation of the third feedback loop may choose said communication flow(s) to be rerouted based on a sorted list of all communication flows, wherein the order in the list is determined by the length of the period, and/or the data size of said TT flows, for example, by selecting the first TT flow(s) in said sorted list of all TT flows.

A different implementation of the third feedback loop may choose said communication flow(s) to be rerouted based on a different sorted list of all communication flows, wherein the order in said list is determined by the number of constraints affecting said communication flows, for example, by selecting the first communication flow(s) in said sorted list of all communication flows.

Yet a different implementation of the third feedback loop may choose said communication flow(s) to be rerouted based on a different sorted list of all communication flows, wherein the order in said list is determined by an estimation of the effect on the fulfillment of constraints determined by the formal analysis, wherein said estimation may be, for example, determined by simulating the removal of said (set of) communication flow(s) and performing the formal analysis without said (set of) communication flow(s).

Another implementation of the third feedback loop may choose said communication flow(s) based on a predefined order among all communication flows, or based on a random selection.

EXAMPLE

Figure 2:
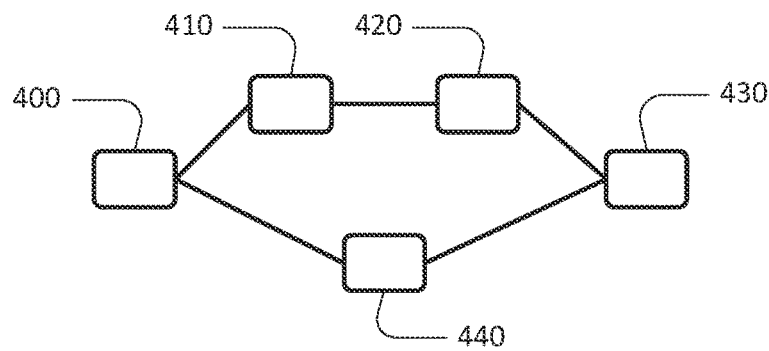
FIG. 2 depicts an example of a topology of a network according to the invention.

A simple example is shown in FIG. 2, which depicts a network, wherein the network topology of said network comprises five components, namely two nodes 400, 430 and three starcouplers 410, 420, 440, and a set of communication flows, in particular two TT flows, f1 with source node 400 and destination node 430, wherein f1 is characterized by a period of 20 ms and a data size of 1500 kbyte, and TT flow f2 with source node 400 and destination node 430, f2 characterized by a period of 10 ms and a data size of 500 kbytes.

Furthermore, f1 and f2 are constrained with scheduling constraint c1 and c2, wherein c1 constrains the transmission time of f1 to be 1 ms relative to the beginning of its 20 ms period and c2 constrains the transmission time of f2 to be 1 ms relative to the beginning of its 10 ms period.

On a first step of the method, the routing module computes routes for f1, and f2, determining for both the same route, comprising the network components, from source to destination, node 400—starcoupler 410—starcoupler 420—node 430.

Figure 3:
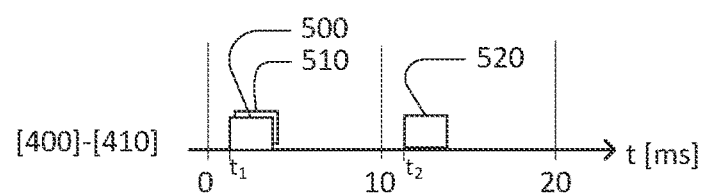
FIG. 3 depicts an example of a network schedule on a second step.

On a second step of the method, the scheduling module computes schedules for f1 satisfying constraints c1, and concludes that a schedule for f2 satisfying constraints c2 cannot be computed, in particular, due to both constraints c1 and c2, requiring network packets of f1 and f2 being scheduled in the same link at the same time. A representation of the schedule upon said second step is depicted in FIG. 3, with packet 500 of flow f1 and packets 510, 520 of flow f2, wherein the second packet 520 of f2, with a period of 10 ms, can be scheduled in the link from node 400—to node 410 (instant t2), but the network packet 500 of f1 and the first network packet 510 of f2 are scheduled in at the same instant t1 relative to the beginning of their periods.

On a third step of the method, the first feedback loop selects f2 based on the shortest communication period to be rerouted by the routing module.

On a fourth step of the method, the routing module computes a new route for f2, determining the route comprising the network components, from source to destination, node 400—starcoupler 440—node 450.

Figure 4:
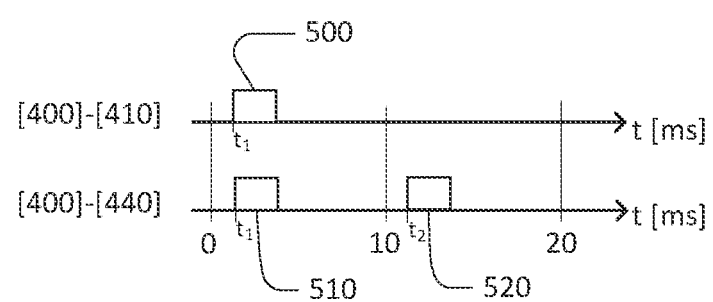
FIG. 4 depicts an example of a network schedule on a fifth step.

On a fifth step of the method, the scheduling module computes a new schedule for f2 satisfying constraints c2. A representation of the schedule upon said fifth step is depicted in FIG. 4, wherein the packet 500 of f1 is scheduled at instant t1 for transmission in the link from node 400 to starcoupler 410 and the packets 510, 520 of 2 are scheduled at instants t1 and t2 for transmission in the link from node 400 to starcoupler 440, hence allowing both constraints c1, and c2 to be fulfilled.

On a sixth step of the method, the analysis module determines that all constraints are fulfilled, and terminates providing the final configuration comprising the routes and schedule for f1 and f2.

We claim:

1. A method for computing a network configuration for the transmission of communication flows in a real-time communication network, wherein the network comprises components comprising nodes or starcouplers, which components are connected by links, and wherein an arrangement of the components and links of the network is described by a network topology, wherein said components of the network communicate via a defined set of communication flows, wherein each of said communication flows comprises an iterative communication of data, each iteration comprising one or multiple network packets, wherein said communication flows comprise time-triggered flows, "TT flows", and rate-constrained flows, "RC flows", and wherein each of said communication flows comprises:

one sender node, source of the communicated data, one or multiple destination nodes, receiver(s) of the communicated data, a unique identifier comprising a unique name or a unique number, a maximum size of the communicated data in one iteration, and a period of communication iterations, being an exact communication period for TT flows, and a minimum communication period for RC flows, wherein said minimum communication period defines a minimum time distance between any two successive communication iterations, wherein a computation of the network configuration takes as input comprising the network topology of said network, the communication flows which are to be communicated in said network, and as additional input a defined set of constraints, which constraints comprise one or more communication constraints comprising scheduling constraints, including at least one of:

a start or end time of transmission, relative to the period for one, more, or all, of said TT flows of the set of communication flows, a start instant or an end instant of reception, relative to the period, for one, more, or all, of said TT flows in the set of communication flows, or a minimum or maximum gap between two or more of said TT flows in the set of communication flows, or real-time constraints, including a maximum or minimum allowed end-to-end communication latency for one, more, or all, of said set of communication flows, and/or a maximum allowed relative jitter in the reception of any of the periodic iterations for one, more, or all, of said set of communication flows, routing constraints, including at least one of:

a set of preferred components to route one, more, or all, of said set of communication flows to faster components, or a set of forbidden components to route one, more, or all, of said set of communication flows to avoid components without time-triggered communication capabilities for TT flows, or resource constraints, including at least one of:

a maximum memory size available for network packet buffering for one, more, or all, of said network components, or a maximum time span a network packet may be buffered before transmission in one, more, or all, of said network components, in particular switch or bridge components, wherein said network configuration comprises at least:

a set of routes, said set of routes comprising one route for each communication flow, each route comprising a network path in said network topology from the sender node to the receiver(s) node(s) represented as a graph wherein the root vertex of said graph is the sender node and each of the receiver nodes is a leave vertex, and wherein each edge in the graph corresponds to a link in the communication network, a time-triggered communication schedule for the transmission of the TT flows, comprising a transmission instant for each network packet of each TT flow, according to the route of said TT flow, and a set of optional RC shaping parameters comprising at least one of audio video bridging (AVB) reserved bandwidth or a set of weights for a weighted round-robin, WRR, service, and wherein said set of routes and said set of schedules fulfill the constraints defined in said set of constraints, wherein the method comprises a first and a second feedback loop, wherein a first step involves computing, based on said network topology and said set of communication constraints, one route for each communication flow of said set of communication flows, whereby one or more routing constraints of said related set of constraints of said flows are fulfilled, wherein, in a second step, after the first step has finished based on
- all TT flows of said set of communication flows,
- all constraints related to said TT flows, and
- said routes for each said TT flows computed by the first module, a time-triggered schedule for the communication of said TT flows is computed, so that one or more, of the constraints related to said TT flows are fulfilled, wherein in a third step, after the second step has finished, a formal timing analysis is performed, according to which an analysis is performed to determine if at least the real-time constraints and resource constraints, and other constraints, from said set of constraints are fulfilled, based on the network routes and the time-triggered schedule, wherein said first feedback loop is provided, according to which in the case that the time-triggered schedule cannot be computed or if the computed time-triggered schedule does not fulfill all of said scheduling constraints wherein said information provided by the first feedback loop relates to one or multiple TT flows from said set of communication flows, which are selected to be rerouted, whereby the criteria to select said candidate TT flow(s) is based on at leat one of the following criteria,
- largest or shortest period(s), or maximum or minimum size(s) of the communication data of said TT flow(s),
- a largest number of scheduling constraints related to said TT flow(s),
- an estimation of the complexity of scheduling said TT flow(s) within the network components of current route(s) of said TT flow(s),
- a defined order based on the unique identifier of said TT flows, or
- a random selection of one or multiple TT flow(s) from the set of communication flows, wherein, according to said information from the first feedback loop, a route is re-computed for said one or multiple TT flow(s), whereby said recomputed route for each TT flow is a different route than a previous route for said TT flow, and the second step is executed again, wherein said second feedback loop is provided, according to which in a case that the formal analysis shows that not all constraints are fulfilled, wherein said information provided by the second feedback loop relates to one or multiple TT flows from said set of communication flows, which are selected to be rescheduled, whereby the criteria to select said so-called "candidate" TT flow(s) is based on at least one of the following criteria,
- at least one of bandwidth utilization or density of scheduled transmissions on the links comprised in the route of said TT flow(s),
- at least one of largest or shortest period(s), or maximum or minimum size(s) of the communication data of said TT flow(s),
- a largest number of scheduling constraints related to said TT flow(s),
- a defined order based on the unique identifier of said TT flows, or
- a random selection of one or multiple TT flow(s) from the set of communication flows, wherein, according to said information from the second feedback loop, the time-triggered schedule is re-computed for said one or multiple TT flow(s), whereby said recomputed schedule for said TT flow(s) is a different schedule than the previous schedule, and the third step is executed again.

2. The method according to claim 1, wherein a third feedback loop is provided, according to which in the case that the formal analysis shows that not all constraints are fulfilled, or a new route for the selected communication flow(s) cannot be computed, wherein said information provided by the third feedback loop relates to one or multiple flows from said set of communication flows, which are selected to be rerouted, whereby the criteria to select said candidate flow(s) is based on at least one of of the following criteria:
- at least one of the largest or shortest period, or maximum or minimum size of the communication data of said flow,
- an estimation of the effect on the fulfillment of constraints determined by the formal analysis upon rerouting said flow(s),
- the largest number of constraints related to said flow(s),
- a defined order based on the unique identifier of said flows, or
- a random selection of one or multiple flow(s) from the set of communication flows, wherein, according to said information from the third feedback loop, a route is re-computed for said one or multiple TT flow(s), whereby said recomputed route for said TT flow(s) is a different route than the previous route(s), and the second step is executed again, wherein the execution of said third feedback loop or said second feedback loop are exclusive to each other and a decision which of said two loops will be executed is based on defined criteria, which defined criteria comprise at least one of:
- a defined maximum number of consecutive occurrences of either of the second or third feedback loops,
- a defined function choosing each time one of said second or said third feedback loops with a rate proportional to a defined factor of the runtimes of said second and third feedback loops,
- a defined function selecting said second or third feedback loop based on an estimation if an effect of rescheduling or rerouting a selected TT flow on the formal analysis for estimating an available time in the schedule of the network component(s) in which the formal analysis failed, or
- a random choice.

3. The method according to claim 1, wherein the first, second and third step and the first, second and third feedback loops are executed iteratively until a configuration fulfilling all constraints is found, or a defined time interval elapses, whereby either of said conditions terminates the method.

4. The method according to claim 1, wherein the set of constraints additionally comprises optimization constraints, including at least one of:
- minimize the end-to-end communication latency of one, more, or all, of said set of flows, minimize the maximum reception/transmission jitter of one, more, or all, of said set of communication flows, minimize the maximum memory required to temporary store network packets in transit of one, more, or all, of said network components, minimize the worst-case end-to-end communication latency for one, more, or all, of said set of communication flows, maximize/minimize a length of intervals in which no TT flows are scheduled for one, more, or all, of said network components, or minimize/maximize intervals in which continuous TT flows are scheduled for one, more, or all, of said network components wherein said optimization constraints are considered as well as the first, second, and third feedback loop during their execution, and wherein the method stops, when the computed network configuration cannot be further optimized according to said optimization constraints and all other constraints are fulfilled, or if a pre-defined time limit is reached.

5. The method according to claim 1, wherein the number of different routes computed for a flow is limited to a predefined maximum number of routing iterations per flow, wherein the first feedback loop and the third feedback loop use said maximum number as a criterion to select the flow(s) to be rerouted.

6. The method according to claim 1, wherein the computation of a different schedule for a set of TT flows with the same routes is limited to a predefined maximum number of scheduling iterations, wherein a set of TT flows are not computed after said predefined number of continuous iterations are reached without having had any of said TT flows that are rerouted.

7. The method according to claim 1, wherein a long-term memory is provided, which is shared and updated by the first, second, and third feedback loop, wherein said long-term memory keeps track of:

a complete set, s1, of explored routes for the set of communication flows, wherein at least one of:

each element, s2, is a set in itself, whereby for each flow in the set, s1, of communication flows, there is a tuple in said set s2 comprising said flow and the route of said flow, wherein each element in s1 represents a mapping of each of the communication flows in the set of communication flows to its route after each iteration, the set of initial routes for each flow, as computed in the first iteration or a configuration comprising the set of routes and schedules, whereby the largest number of constraints in the set of constraints are fulfilled, and wherein the first, second, and third feedback loop, base their execution on content of said long-term memory.

8. The method according to claim 1, wherein a medium-term memory is provided, which is shared and updated by at least one of the first, second, or third feedback loop, wherein said medium-term memory keeps track of at least one of:

a set of explored routes within consecutive iterations of the first feedback loop, a set of computed routes within consecutive iterations of the third feedback loop, a set of computed schedules for consecutive executions with the same set of routes for the TT flow, or a last successful schedule, if any, for the TT flows while the routes TT flows are not changed when the rerouting of an RC flow occurs, wherein the first, second, and third feedback loop, base their execution on the content of said medium-term memory.

9. The method according to claim 1, wherein:

in the case that the formal analysis shows that not all constraints are fulfilled and a predefined time limit is reached, a partial network configuration is provided, wherein said partial network configuration relates to a subset of flows of the set of flows fulfilling a subset of related constraints in the set of constraints, in the case that the formal analysis shows that not all constraints are fulfilled and a predefined number of iterations, of either first, second, or optionally third feedback loops, is reached, a partial network configuration is provided, wherein said partial network configuration relates to a subset of flows of the set of flows fulfilling a subset of the related constraints in the set of constraints, or in the case that the formal analysis shows that all of the communication constraints are fulfilled and at least one of the optional optimization constraints are optimized to a defined threshold with respect to the optimal value, a partial network configuration is provided, wherein said partial network configuration relates to a subset of flows of the set of flows fulfilling a subset of the related constraints in the set of constraints.

10. The method according to claim 9, wherein said partial network configuration is selected among all previous configurations computed in preceding iterations, and wherein said selection is based on defined criteria, including the single one, or any one if multiple exist, of the configuration(s) fulfilling (a) a larger number of communication constraints of the set of constraints, or the single one, or any one if multiple exist, of the configuration(s) fulfilling (b) all related communication constraints of the set of constraints for a largest subset of communication flows of the set of communication flows, wherein among all existing configurations fulfilling (a) or (b), the configuration additionally fulfilling the larger number of optimization constraints from the set of constraints is selected.

11. The method according to claim 1, wherein the network is a time-triggered (TT) network, or a time-sensitive network (TSN), and wherein components of said time-triggered network communicate TT flows according to a schedule based on a global, network-wide time.

12. The method according to claim 1, wherein at least one of TT flows are transmitted according to TTEthernet or TSN/802.1Qbv, or RC flows are transmitted according to Aeronautical Radio, Incorporated (ARINC) 664p7 or AVB/TSN.

13. The method according to claim 1, wherein the method is based on exact methods, including at least one of: as satisfiability modulo theories (SMT) or interger linear programming (ILP) or mixed-interger programming (MIP) solvers.

14. The method according to claim 1, wherein the method is based on heuristic methods, including at least one of: as Tabu search or Simulated Annealing, and wherein the formal analysis is based on Network Calculus.

15. The method according to claim 1, wherein at least one of: the first, second, and third feedback loop are executed in a computer system, or the first, second, and third feedback loop are executed in a distributed computer system comprising a cloud-based computer system.

16. A real-time communication network, which comprises components comprising nodes or starcouplers, which components are connected by links, and wherein an arrangement of the components and links of the network is described by a network topology, wherein said components of the network communicate via a defined set of communication flows, wherein each of said communication flows comprises an iterative communication of data, each iteration comprising one or multiple network packets, wherein said communication flows comprise time-triggered flows, "TT flows", and rate-constrained flows, "RC flows", and wherein each of said communication flows comprises
one sender node, source of the communicated data,
one or multiple destination nodes, receiver(s) of the communicated data,
a unique identifier comprising a unique name or a unique number,
the maximum size of the communicated data in one iteration, and
the period of the communication iterations, being
the exact communication period for TT flows, and
the minimum communication period for RC flows, wherein said minimum communication period defines the minimum time distance between any two successive communication iterations, wherein the communication flows of the network are communicated according to a network configuration, and wherein the real-time network is configured to compute said network configuration for the transmission of the communication flows with a method according to claim 1.

17. The method according to claim 1 that is executed on computer system comprising a cloud-based computer system, wherein said computer system comprises, is part of, or connected to a real-time network.

18. The method according to claim 17, wherein a routing module, scheduling module, and analysis modules, and/or said first, second, and optionally third, feedback loops, are implemented in the computer system as software components, which are independent from each other, or are combined in one or more software components, which software component or software components are running on said computer system, or are implemented in one or more software libraries.

* * * * *